United States Patent
Beck et al.

(10) Patent No.: US 11,002,868 B2
(45) Date of Patent: May 11, 2021

(54) NEUTRON DETECTOR AND METHOD FOR ITS PREPARATION

(71) Applicants: NUCLEAR RESEARCH CENTER NEGEV, Beer-Sheva (IL); B.G. NEGEV TECHNOLOGIES AND APPLICATIONS LTD., AT BEN-GURION UNIVERSITY, Beer-Sheva (IL)

(72) Inventors: Arie Beck, Omer (IL); Udi Wengrowicz, Meitar (IL); Eitan Tiferet, Meitar (IL); Avi Raveh, Omer (IL); Michael Chonin, Arad (IL); Itzhak Orion, Beer-Sheva (IL)

(73) Assignees: NUCLEAR RESEARCH CENTER NEGEV, Beer-Sheva (IL); B.G. NEGEV TECHNOLOGIES AND APPLICATIONS LTD., AT BEN-GURION UNIVERSITY, Beer-Sheva (IL)

( * ) Notice: Subject to any disclaimer, the term of this patent is extended or adjusted under 35 U.S.C. 154(b) by 0 days.

(21) Appl. No.: 16/274,506

(22) Filed: Feb. 13, 2019

(65) Prior Publication Data
US 2020/0025956 A1    Jan. 23, 2020

Related U.S. Application Data

(63) Continuation-in-part of application No. PCT/IL2017/050896, filed on Aug. 14, 2017.
(Continued)

(51) Int. Cl.
*H01J 47/00*    (2006.01)
*G01T 3/00*     (2006.01)

(52) U.S. Cl.
CPC .................................... *G01T 3/008* (2013.01)

(58) Field of Classification Search
CPC .. G01T 3/008; G01T 3/08; G01T 3/00; G21C 17/10; Y02E 30/30
See application file for complete search history.

(56) References Cited

U.S. PATENT DOCUMENTS

| 3,879,612 A | 4/1975 | Foster et al. |
| 4,227,086 A * | 10/1980 | Dreyfus ................... G01R 5/28 |
| | | 250/389 |

(Continued)

OTHER PUBLICATIONS

International Search Report and Written Opinion of the ISA for PCT/IL2017/050896 dated Dec. 11, 2017, 9 pages.

*Primary Examiner* — Kiho Kim
(74) *Attorney, Agent, or Firm* — Nixon & Vanderhye P.C.

(57) ABSTRACT

A device for detecting neutrons comprising a base, a lateral surface and a cover, thereby providing a detector housing having a central longitudinal axis, wherein the interior of the housing is divided into n (n≥2) cells wherein at least one of said cells is adapted to operate as neutron detection ion chamber by having at least one removable foil disposed parallel to said longitudinal axis, at least one removable foil positioned adjacent to, and essentially parallel with, a sector of the lateral surface, with said removable foils having neutron sensitive coating applied on at least one their faces, and an anode mounted in at least one cell bounded by said removable foils, with said housing constituting the cathode. The device is also useful for simultaneously detecting gamma irradiation and or producing radioisotopes.

13 Claims, 6 Drawing Sheets

Related U.S. Application Data

(60) Provisional application No. 62/374,841, filed on Aug. 14, 2016.

(56) References Cited

U.S. PATENT DOCUMENTS

| | | |
|---|---|---|
| 7,910,893 B2 | 3/2011 | Glesius et al. |
| 2009/0122948 A1* | 5/2009 | Charmensat ............ G21D 3/008 376/450 |
| 2009/0323887 A1 | 12/2009 | Liu et al. |
| 2011/0266451 A1* | 11/2011 | Achtzehn .................. G01T 3/06 250/362 |
| 2013/0228696 A1 | 9/2013 | McGregor et al. |
| 2015/0055742 A1 | 2/2015 | Heibel |

\* cited by examiner

NEUTRON DETECTOR AND METHOD FOR ITS PREPARATION

This application is a continuation-in-part application of the International Application No. PCT/IL2017/050896 filed Aug. 14, 2017 and claims the benefit of U.S. Provisional Application No. 62/374,841 filed Aug. 14, 2016, the entire contents of each of which are hereby incorporated by reference.

The present invention relates to a device for detecting neutrons, and is intended especially for service in the core of a nuclear reactor. Owing to its unique configuration, the detector of the present invention is able to simultaneously fulfill additional functions, such as detection of gamma radiation and production of radioactive isotopes.

In-core neutron detectors are used to monitor the local neutron flux inside the core of a nuclear reactor and its surroundings. These measurements are crucial to validate the core model, especially in transient conditions where safety and emergency actions are to be considered. The concept of in-core local flux detector is useful to identify and generate alarm signals for undesired mechanical behavior of the core, such as vibrations or loose parts. In-core sensors are of small size, with diameters that are typically few centimeters or less. In-core neutron detector must meet a set of stringent requirements to be able to withstand the severe environment that exists in the core of nuclear reactor, that is, to work under extreme operating conditions such as very high temperatures (>300° C.) and exposure to neutron flux of up to $10^{14}$ nv (nv=neutron cm$^{-2}$ s$^{-1}$).

In-core detectors generally fall into two categories: the self-powered neutron detector (SPND); and micro neutron detectors, also called Micro-Pocket Fission Detectors (MPFDs).

Self-Powered Neutron Detectors (SPNDs) incorporate a material with a high cross-section for neutron capture, leading to subsequent beta or gamma decay. By measuring the beta decay current following capture of neutrons, an electrical signal proportional to the neutron flux is obtained. This signal is usually read with an electrometer type amplifier. Because the beta decay current is measured directly, no external bias voltage is required. The key to the detector performance lies in the choice of a neutron-sensitive material together with the energy and half-life of the resulting beta activity. A common configuration is based on a central electrode, called an emitter, made of rhodium or vanadium wire, and an outer electrode called a collector, made of high purity stainless steel or Inconel. The intervening space is filled with an insulator. Due to its ability to withstand the extreme temperature and radiation found in a reactor core, magnesium or aluminum oxide is commonly used as the insulator. Among the main advantages of SPND detectors, their small diameter (<1 cm), low cost, ability to work in extreme environmental conditions, and relatively simple electronics should be noted. The disadvantages derive from the low current produced (~$10^{-23}$ to $10^{-21}$ A/nv) and their relatively slow response.

Micro Neutron Detectors, also called Micro-pocket fission detectors (MPFD) include relatively small pockets of gas including a neutron reactive material. Therefore, each pocket constitutes an ionization chamber. The inner walls of the chamber are coated with a thin layer of neutron-reactive material, such as $^{235}U$, $^{238}U$, $^{233}U$, $^{232}Th$, $^{239}Pu$, $^{10}B$ and $^{6}Li$. Neutron interactions in the reactive coating cause the emission of charged particles, which in turn reach a gaseous volume. There, ionization in the form of electron-ion pairs production occurs. A bias voltage causes the electric charge carriers to drift towards the electrodes and to create an electric pulse. Alternatively, in strong neutron fields, the signal can be read in continues current mode.

To summarize, common designs of commercially available in-core neutron detectors are based on Self-Powered Neutron Detectors (SPDs), Mini Fission Chambers (mini FC) and Micro-Pocket Fission Detectors (MPFDs). SPDs incorporates a material with a high cross-section for neutron capture, leading to subsequent beta or gamma decay. Mini FC incorporates co-axially positioned electrodes. MPFDs utilize the same operational concept of FC designs, but with geometry that uses parallel plate electrodes instead of coaxial cylinders.

For neutron detectors employed for other purposes, e.g., homeland security applications, other configurations have been proposed, for example, in U.S. Pat. No. 7,910,893. As shown in FIG. 2 of U.S. Pat. No. 7,910,893, a cylindrical container 1 is divided into six identical sectors 28A, 28B, 28C, 28D, 28E and 28F by means of a coaxially mounted divider consisting of six fin spokes 46. In each of these six sectors, an anode wire is mounted (22A, 22B, 22C, 22D, 22E and 22F, respectively). The sectors 28A, 28B, 28C, 28D, 28E and 28F are filled with a suitable gas. Cylindrical container 1 is therefore divided into six detectors which are identical not only in shape and size, but also in function, because the entire inner face of cylindrical container 1 and the surfaces of individual fin spokes 46 are all coated with the same neutron sensitive material.

We have now found an elegant and versatile configuration enabling an effective division of the interior volume of a detector, for example, a cylindrically shaped detector, to provide a plurality of volume portions aligned in parallel to the longitudinal axis of the detector. We use the term "cell" to indicate each of these individual volume portions. Each cell can serve a different function. For example, one or more cells are assigned with the task of neutron detection whereas adjacent cells are dedicated for γ-radiation detection and remaining cells for the production of radioactive isotopes. We use the term "neutron detection ion chamber" to indicate a cell adapted for such function. Walls of a neutron detection ion chamber will have neutron sensitive materials applied on their faces. One important feature of the present invention is that the neutron sensitive materials are not applied as coatings onto permanent walls placed in the detector, but are rather incorporated into the detector in the form of removable coated foils, which can be inserted and replaced in due course with a different type of coated foils, or can be removed without replacement of the old foils, to redefine the function of each individual cell. The removable foils are positioned in place with the aid of suitable slots or rails that hold the opposite edges of the foils, or in addition, the foils lean against the lateral surface of the detector housing, or against permanent partitions disposed in the detector. Such structures (miniature slots, rails, and internal partitions), which are needed to support the removable foils, are difficult to produce by ordinary machinery methods, but were successfully created according to the present invention using Additive Manufacturing (AM) techniques, as described below.

Accordingly, the invention relates to a device for detecting neutrons comprising a base, a lateral surface and a cover, thereby providing a detector housing having a central longitudinal axis, wherein the interior of the housing is divided into n (n≥2) cells wherein at least one of said cells is adapted to operate as neutron detection ion chamber by having at least one removable foil disposed parallel to said longitudinal axis and at least one removable foil positioned adjacent to, and essentially parallel with, a sector of the lateral surface, with said removable foils having neutron sensitive coating applied on at least one their faces, and anode mounted in said cell bounded by said removable foils, with said housing constituting the cathode.

For example, one simple design of the device is based on a housing with a cylindrical shape divided into two cells with the aid of a pair of diametrically opposed slots holding the opposite edges of a rectangular removable foil thereby dividing the cylindrical interior volume into two equal cells. A removable foil with a curvature corresponding to the lateral surface of the cylinder is placed to cover one half of the cylindrical surface. An anode is mounted in the cell bounded by these two foils, thereby creating a cell adapted to function as a neutron detection ion chamber. Another example is based on a permanent partition extending in parallel to the cylindrical axis to split up the interior volume prior to insertion of the removable foils, to support a pair removable coated foils, one foil on each of the opposite faces of the permanent partition, to enable the creation of a pair of cells each operative as neutron detection ion chamber (with anode mounted in each cell). The exact features of the slots and permanent partitions are described below in reference to the drawings illustrating more sophisticated designs of the device of the invention.

More specifically, the invention provides a device for detecting neutrons, comprising a base, a lateral surface and a cover, thereby providing a detector housing having a central longitudinal axis, wherein the interior of the housing is subdivided into n (n≥2) cells, preferably (n≥3), wherein at least one of said cells is adapted to operate as neutron detection ion chamber, said neutron detection ion chamber being defined by a pair of removably disposed foils extending essentially radially outward from the central longitudinal axis and a removably disposed foil placed adjacent to, and essentially parallel with, a sector of the lateral surface, with said removable foils having neutron sensitive coating applied on at least one their faces, and anode mounted in said cell bounded by said three removable foils, with said housing constituting the cathode.

As pointed out above, the detector preferably has the shape of a circular cylinder, that is, the lateral surface is a lateral surface of a circular cylinder. However, other designs can also be used, e.g., the detector may have the shape of elliptical cylinder or parallelepiped, e.g., rectangular parallelepiped. The total number of cells may be, for example, from 2 to 10, e.g., from 2 to 8, more specifically from 2 to 6, e.g., from 2 to 4, inclusive. In the specific illustration shown below, the interior of the housing has been divided into four cells, identical in shape and size. However, other subdivisions are allowed, e.g., the cells need not necessarily be identical to one another in shape and size.

The removable foils in each individual neutron detection ion chamber are coated with the same neutron sensitive coating. But one important advantage offered by the invention is that neutron detection ion chambers may differ from one another in the type of neutron sensitive coating material applied on their internal walls (i.e., on the removable foils incorporated into the cell). Preferably, the device comprises at least two neutron detection ion chambers, with a first neutron detection ion chamber having a first neutron sensitive coating applied on the removable foils defining the walls of the said first chamber, and a second neutron detection ion chamber having a second neutron sensitive coating applied on the removable foils defining the walls of the said second chamber, wherein said first and second neutron sensitive coatings are made of different materials.

The terms "neutron sensitive coating", "conversion layer", "neutron converter" and the like are used herein interchangeably.

The removable foils are generally rectangular in shape and are usually made of aluminum; the thickness of the foils is a few tenths of a millimeter, e.g., 0.4 mm to 0.9 mm, and the conversion layer thickness usually is a few micrometers, e.g., 1-5 micrometers. Examples of conversion thin layers to be applied on such foils include natural uranium oxide ($^{Nat}UO_2$) for detection of fast and thermal neutron, thorium for detection of fast neutron, boron-10, e.g., boron-carbide ($^{10}B$ enriched, $^{10}B_4C$) for thermal neutron and others, e.g., as mentioned above. Of course, any unnatural uranium enrichment or composition can be considered as well. These coating can be made on the foil by sputtering deposition, vapor deposition or electro-chemical coating methods.

Using different coating or conversion materials at each cell will allow an offline reconstruction of the neutron energy spectra in the reactor. Alternatively, using the same conversion material in all cells but with different concentrations, enrichments, or active surface dimension within each individual cell, will significantly extend the dynamic range of the whole detector.

In an embodiment of the invention, the first neutron sensitive coating is $^{10}B_4C$ and the second neutron sensitive coating is $UO_2$. As pointed out above, a neutron detection ion chamber is filled with a gas, e.g., pure argon, xenon, nitrogen or gas mixtures, such as argon+10% methane. The gas pressure varies from 1 atm up to several atm.

The total number of neutron detection ion chambers is from 1 to n, inclusive. In some embodiments of the invention, the number of neutron detection ion chambers is less than n, e.g., the number is n−1, or n−2, or n−3, with the remaining cells (formed by permanent partitions disposed in the housing as described below, without having removable foils converters on the faces of these partitions) are designed to meet other functions. For example:

In some embodiments of the present invention, the device may comprise one or more cells defined by permanent partitions, which cells are devoid of removable foils and an anode, such that these cell(s) are suitable as receptacle(s) for target materials to be converted into radioisotopes by neutron activation, as explained in detail below;

In some embodiments of the present invention, one or more cells defined by permanent partitions can be left without any converter, to measure the core local gamma field. Such gamma detection ion chambers can be used to compensate other sub-detector readouts against the contribution of the core gamma field to their performance. These cells will also have an anode mounted in their interior, similarly to the neutron detection ion chambers; and In some embodiments of the present invention, one or more cells are dedicated to hold or support complementary sensors, within the same enclosure of the radiation detector. For example, one dedicated small cell may include a thermocouple used for temperature measurement while another may include an accelerometer for vibration measurement.

Turning now to the structural properties of the device of the invention, structures are mounted in the internal space of the device, to support and hold the removably disposed neutron converter foils.

An array of slots and/or rails or channel-like structures is provided in the interior of the detector, to fix the removably disposed neutron converter foils in place, e.g., by causing the foils to smoothly slide along suitable slots and rails to fit into their final positions, thereby generating the cells described above. The term "slots", "rails" or "channel/ tunnel-like spaces" are used interchangeably to indicate structures able to hold the edges of a converter foil. The array of slots comprises:

longitudinally-aligned central slots;

longitudinally-aligned peripheral slots facing said central slots; and longitudinally-aligned lateral slots;

wherein opposite edges of a removably disposed, radially extending foil are held by a pair of opposing slots, consisting of a longitudinally-aligned central slot and a longitudinally-aligned peripheral slot, and wherein opposite edges of a removably disposed foil in a position adjacent to, and parallel with, the lateral surface, are held by a pair of lateral slots.

Another type of structures placed in the interior of the detector housing consists of permanent partitions extending radially outward from the central longitudinal axis, with the removably disposed foils being supported by said permanent partitions.

In one embodiment of the invention, the lateral surface of the housing is a lateral surface of a cylinder, with an axially positioned rod mounted inside the housing; a set of longitudinally aligned central slots is provided on said axially positioned rod; a set of longitudinally aligned peripheral slots is (preferably evenly) distributed around the circumference of the lateral surface and facing said central slots (for holding opposite edges of removable foils extending outwardly from said rod towards the lateral surface) and a set of channels is provided adjacent to the lateral surface (for holding removable foils adjacent to, and parallel with, the lateral surface).

For example, FIG. 1 is an isometric view showing the interior of one preferred device 100 according to the invention. FIG. 1 is intended to illustrate an arrangement of slots enabling division of the interior of a cylinder into four individual cells; for the purpose of simplicity, neither the removable foils nor anode wires mounted within the cells are shown in FIG. 1.

The cylindrical lateral surface 101 defines an internal space 102, with an axially positioned rod 103 mounted inside. A set of longitudinally-aligned central slots, collectively indicated by numeral 104, is provided on the axially positioned rod 103 (e.g., in the form of longitudinal recesses). In the specific embodiment shown, the axially-positioned rod has a square cross-section, with four central slots, each slot on one of the four longitudinal faces of the rod. These individual central slots are designated 104A, 104B, 104C and 104D.

A set of longitudinally-aligned peripheral slots, collectively indicated by numeral 105, are evenly distributed around the inner face of said lateral surface. Four peripheral slots are shown, designated 105A, 105B, 105C and 105D.

It is seen that each central slot can be paired with a peripheral slot lying in radial direction (104A-105A; 104B-105B, 104C-105C and 104D-105D). Into each pair of radially opposed slots, two removably disposed foil coated with a neutron-sensitive material (not shown) can be easily inserted, each assigned of course to a different cell. For example, the 104B-105B pair will hold the opposite edges of a first foil defining a wall for cell 1, and also the opposite edges of a second foil defining a wall for cell 2. The foil's thickness is a few tenths of a millimeter, as described above, such that two foils can easily fit into one pair of slots, whose characteristic width can be larger than 1 mm, in order to define walls for adjacent cells (e.g., cells 1 and 2).

As shown in FIG. 1, in a preferred embodiment of the invention, T-beam shaped structures (106) are distributed around the circumference of the lateral surface (106A, 106B, 106C, 106D), wherein the vertical section of each T-beam shaped structure (e.g., 120B) is attached to the lateral surface and is parallel to the axially positioned rod (103), with the front of two-arms section (e.g., 121B) of the T-beam shaped structure (106B) facing the axially positioned rod.

The T-beam shaped structures enable the creation of both the peripheral slots and the lateral slots. By T-beam shaped structure is meant a structure comprising a vertical section and a horizontal section, with T-shaped cross section. Herein the "two-arms" section refers to the (normally) horizontal section of a T-beam shaped structure.

A two-arms section (e.g., 121B) of a T-beam shaped structure (e.g., 106B) has a recess (e.g., 105B) extending over its length, defining a longitudinally aligned peripheral slot opposite to a longitudinally aligned central slot (e.g., 104B) recessed in the axially positioned rod, with the opposite edges of a removable foil (not shown) being held by said pair of opposite slots.

Channel-like spaces are provided between the lateral surface of the housing and the back of the two-arms section of the T-beam shaped members, said channels defining pairs of opposite slots (e.g., 123A, 123B) adjacent to the lateral surface, such that the opposite edges of a removable foil (not shown) are held by said pair of opposite lateral slots in a position adjacent to and parallel with the lateral surface. It is seen that the edges of a lateral removable foil are supported by a pair of opposite slots (for example, 123A, 123B) created by adjacent T-beam shaped members (106A, 106B).

Turning now to FIGS. 2A and 2B, it is noted that these Figures show another important variant of the invention, which differs from the previously described embodiment of FIG. 1 in that in addition to an array of slots and rails to hold the removably disposed neutron-sensitive foils, there are also permanent partitions 107A, 107B, 107C and 107D placed in the internal space of the detector, said partitions extending radially outward from a central longitudinal rod 108 (with a protruding screw head, as described below) to create four cells (but because these partitions are not coated with neutron sensitive material, they cannot define cells operative as neutron detection units). The permanent partition (e.g., 107D) joins a T-Beam shaped structure positioned in a radial direction (106D), (with extensions in the front of the two-arms section of 106D towards the central rod). Each of the two faces of the partition 107D is associated with a pair of slots: a longitudinally aligned peripheral slot (105D on one side and 105DD on the other side of the partition) and a longitudinally aligned central slot (104D on one side and 104DD on the other side of the partition), each opposite pair (104D-105D and 104DD-105DD) for holding the edges of a removable foil. Therefore, each of the opposite faces of a permanent partition (e.g., 107D) can support a removable foil extending outwardly from the central rod towards the lateral surface, defining the walls of a neutron ion detection chamber.

FIG. 2B is a photo of a detector body 100 produced according to the design shown in FIG. 2A, comprising four cells 1, 2, 3 and 4. It is shown how a foil 109, coated with a thin layer of neutron sensitive material, slides on rails defined by the arms of member 106 as explained above to fit in place in cell 1. The removably disposed foil 109 is placed adjacent to, and essentially parallel with, a sector of the lateral surface.

The inner diameter of the detector housing of the invention can vary from about 1.0 cm, e.g., from 2.0 cm, up to 5.0 cm (e.g. from 2.0 to 4.0 cm, for example around 3.0 cm).

The outer diameter of the device is a few millimeters greater than the inner diameter, e.g., 0.5 to 1.0 cm greater. The length of the lateral surface defining the interior of the device is from 2 cm to more than 10 cm, preferably 4 to 7 cm.

Turning now to the illustration of cover suited for the device of the invention, it should be borne in mind that in addition to sealing and preventing the escape of the ionizing gas, the cover is also designed to serve other purposes. For example, FIG. 3A is a photo showing a design of a cover for a detector body 100 of FIG. 2B, to enable the mounting of anode wires within the four cells of detector body 100. In the embodiment shown in FIG. 3A, each of the four cells of the detector 100 is intended to function either as neutron detection ion chamber or gamma detection ion chamber. Accordingly, from cover 200, four anode metal wires 201 extend downwardly. The diameter of an anode wire is generally about 0.5 mm to 1 mm. The wires are spaced apart from one another and are arranged such that on placing cover 200 atop of the detector body 100, as shown in FIG. 3B and fastening same by screwing holding nut 108 protruding from the detector cover 200, each of the wires will fit into an individual cell in the device 100, ideally at the center of each cell. Electrical connections, namely, four anode electrical connecting wires collectively indicated by numeral 202, and cathode electrical connecting wire 203 are also shown in FIG. 3B and are discussed below in more detail in reference to FIG. 5 (coax cables with shield are indicated by a broken line). It should also be noted that to seal the ionizing gas, the cover 200 has a groove, where an O-ring seal or indium wire can be inserted. Alternatively, the detector cover can be welded to the case, using laser welding, Tungsten inert gas (TIG) welding or other similar techniques.

FIGS. 4A, 4B and 4C illustrate a more robust configuration of a cover assembly 300, placed atop detector body 100 and designed to increase durability and serve different tasks assigned to the detector. In its general form, the cover assembly comprises a cover base and one or more tubes extending upwardly from said cover base, with at least one tube enclosing a conductor, most preferably rigid metal wire, guided via said tube through an access hole in the cover base into a cell in the interior of the detector housing, said conductor being electrically insulated from the inner walls of said tube by means of an insulator occupying the annular space between the inner walls of said tube and the conductor.

More specifically, cover assembly 300 includes base assembly 301, having four access openings (not shown) enabling access into each of the four individual cells of detector body 100. From the upper face of base assembly 301, four protective (e.g., aluminum-made) tubes 302 extend upwardly, corresponding in position to said access openings. Tubes 302 which can be up several decimeters long, e.g. 20 cm to 50 cm long, with inner diameter varying from 1.0 mm to 2.0 mm, act as "service sleeves" for, e.g., 22 AWG to 16 AWG (0.65 mm to 1.3 mm dia.) single conductor cables including a thin insulation. Tubes 302 are supported by one or more spacer elements 303, e.g., ring-shaped members or the like which are 1.5 to 3.0 cm spaced apart from one another, to impart stability to the "tower-like" structure consisting of tubes 302. This assembly, consisting of base assembly 301, tubes 302 and spacers 303 can be produced as one single piece, using AM techniques such as 3D printing, and is preferably made of aluminum as described below.

An insulator tube 304, made of any suitable material with high heat and radiation resistance, e.g., ceramic tube, or meta-aramid fibers (such as Nomex® insulated conductors) with outer diameter ranging from 1 mm to 2 mm and inner diameter ranging from 0.65 mm to 1.3 mm, is inserted into each of the protective tubes 302. Insulator tube 304 reaches the level of base assembly and does not protrude into the interior of detector body 100. Conducting wire 305 is inserted through each of the ceramic tubes 304, penetrating to the interior of detector body 100. Conducting wire 305 is fairly rigid, its diameter is about 0.65 mm to 1.3 mm dia (22 AWG to 16 AWG) and it is preferably made of an aluminum alloy. This rigid wire 305 thus becomes the anode mounted in a cell intended to function as a neutron detection ion chamber (or s gamma detection ion chamber), as best illustrated by FIG. 4C.

The arrangement illustrated in FIGS. 4A and 4B distances the connections of the anodes (i.e., rigid wires 305) from the reactor core, throughout the protective tubes to electrically conducting lines that will feed the signal into the amplifiers, as discussed below in reference to FIG. 5. The advantage of the above arrangement lies in its fabrication simplicity (as pointed out above, the base assembly 301, tubes 302 and spacers 303 can be produced as a single structure using AM techniques), while enhancing the resistivity to the extreme temperature and radiation conditions existing in a reactor core. With this approach it is possible to seal the instrument (e.g. applying a sealing paste) far from the reactor core where the radiation field is reduced by order of magnitudes.

Regarding the preparation of the device, as mentioned above, Additive Manufacturing (AM) techniques were used to produce the device from aluminum alloys. It is worth noting that Aluminum ($^{26}$Al) has a low cross section to thermal neutrons and the activation products ($^{27}$Al) quickly decay (T1/2~=2 min). Therefore, most of the reactor nuclear instrumentations are made of aluminum alloys. AM techniques enable to produce complex aluminum parts that are difficult to make by ordinary mechanical processing methods. Specifically, aluminum alloy AlSi$_{10}$Mg was used. But other metal alloys which are chemically and physically compatible to the neutron flux and extreme environment condition existing in a nuclear reactor can also be used. The unique design in the housing of the device is manufactured utilizing advance AM techniques such as 3d-printing. For example, powder bed Selective Laser Melting (SLM) method. Using AM novel design, the detector case is easily split into several sub-divisions as described above. A complete detailed manufacturing protocol is given in an example below. It should be noted that the structures producible by AM techniques, which are capable of holding the removable coated foils for the purpose of neutron detection, constitute a separate aspect of the invention. That is, the invention also pertains to the canisters illustrated in the appended drawings prior to insertion of the foils inside.

Turning now to the electrical connections of the anodes and cathode, FIG. 5 is a schematic diagram of the electrical connections of the detector to an electrometer type preamplifier. The detector housing constitutes the cathode for all neutron detection ion chambers. In current mode operation, it is negative polarized, hence, the detector housing has to be electrically insulated from other reactor materials. The central screw shown in FIG. 3, which is part of the detector case is connected to the signal conductor of a co-axial cable using a cable lock. The other edge of this wire is connected to a negative power supply (−HV) through a passive Low Pass Filter (LPF) providing a low ripple negative potential to the cathode of all neutron detection ion chambers. The shield of this coax cable is connected to the common potential only at the entrance to the electrometer amplifier, therefore, the detector case is electrically "floating" related to the detector core.

The output signal of each neutron detection ion chamber is related to the converter reaction rate and to the energy deposited by the reaction products in the ionization volume. The reaction rate of the converter material is related to the coated area and thickness and the converter cross section for the energy of the neutron flux. The rate of energy deposition [keV/μm] of the reaction products in the coating material is large, therefore the coating thickness is limited to less than a few micro-meters. For small dimension ionizing volumes, such as the cavities in the neutron detection ion chambers of the present invention, the reaction products that reach the ionizing volume deposit only part of their energy. For current mode operation using converters such as $^{10}B$, typical currents of $10^{-17}$ amp/nv are obtained (nv=n $cm^{-2}$ $s^{-1}$). To measure the tiny charges left in matter by the passage of ionizing radiation, it is required to connect the anode of each neutron detection ion chamber to an electrometer type amplifier, such as Analog Devices—ADA4530. In this type of amplifiers, the input impedance is so high that the current flowing into it can be considered, for most practical purposes, to be zero. The output signals (Voltage) are the product of each detector ionizing current by the amplifier feedback resistor. A scheme of the anode connection of one of the neutron detection ion chambers to an electrometer amplifier is shown in FIG. 5. In electrometer amplifiers, the input bias currents are lower than 1pA, hence, the voltage output can simply be considered as Vout=$-i_{det}$*R feedback. In the scheme presented in FIG. 5, a feedback resistor of $10^{12}$ Ω is connected. For higher currents, lower amplification is required. In the presented scheme, it is possible to reduce the feedback resistance by parallel connection of a $10^9$ Ω resistor. This is simply performed by turning on a reed-relay serially connected to the resistor.

As described above, all neutron detection ion chambers share a common cathode potential. For current mode the cathode is typically at −HV potential and the anodes are connected to the input of electrometer amplifiers which are at virtual ground. For pulse mode operation, the common cathode can be at ground potential and the potential at each of the anodes can be optimized separately. In both modes of operation, the removable foils have the same potential as the cathode. The potential between anodes and cathode is typically in the range of +100V to +600V. Electrical isolation of the anodes from the cathode is typically achieved using ceramics insulators such as: alumina, quartz or glass. Seal paste resistant to high operating temperatures and radiation damage can also be applied.

As mentioned above, another aspect of invention is a method for producing radioisotopes. In several fields including medicine, industry and research there are extensive applications for radioisotopes, usually these activities support several areas of economic significance. Radioisotopes, radiation sources and radiolabel led compounds are formed by nuclear reactions on target materials in a reactor or cyclotron. Most of these isotopes are conventionally produced by exposing the target materials to the neutron flux in a nuclear reactor for an appropriate time. According to the IAEA (International Atomic Energy Association), more than 70 research reactors are in operation for the regular production of medical and industrial isotopes, around the world. The research reactors used for radioisotope production can be broadly classified into:

enriched uranium, light water moderated, swimming pool type reactors; and natural uranium, heavy water moderated and cooled tank type reactors.

In swimming pool type reactors, the core is compact and visible, and is accessible from the top of the pool. Target materials to be irradiated are sealed in primary capsules (usually made of quartz), loaded in specially designed irradiation jigs and then lowered in predetermined locations in the core for irradiation. In these type of reactors, the core being easily accessible, loading and unloading of targets are easy, and can be carried out from top of the pool using simple devices. The irradiated targets within their capsules are then loaded in appropriate shielding containers and transported to the radioisotope processing laboratories.

In the tank type reactors, the irradiation assemblies contain many target capsules and are lowered using specially designed jigs. In this type of reactors, tubes conventionally found in the reactor vessels are used as assemblies for retention the targets that are exposed to the neutron flux. The production of radioisotopes generally requires cumbersome and expensive irradiation and extraction equipment, which may be cost-, space-, and/or safety-prohibitive at end-use facilities.

It is worth noting that in a neutron reactor, individual enclosures are used to measure the neutron flux and to contain the radioisotopes target material. The present invention incorporated these two different devices, into a single instrument. That is, a device that can mutually serve as a gamma and neutron sensor, that also contains one or more free cells to introduce materials to be irradiated in the production of radioisotopes is provided by the present invention. The present invention may improve the gamma and neutron radiation measurement exactly where the material to be irradiated is exposed. Because the activity of the produced radioisotope is directly related to the exposure time and the neutron flux, a more accurate neutron flux measurement at the target material irradiation place, a better accuracy of the activity of the produced radioisotope, allow economical optimization of the whole process.

As previously described, in swimming pool type reactors the core is easily accessible, loading and unloading of targets or instruments such as the detector presented here, are easy, and can be carried out from top of the pool using simple devices. Related to this type of reactors, one of the aspects of the present invention, is the use of one or more of the detector internal free cells, to contain materials that will be irradiated in radio-isotope production processes. For example, to produce long lived radioisotopes, such as cobalt-60 or iridium-192, free cells in the enclosure of the detector, can be used as a suitable receptacle for a quartz capsule containing the materials to be irradiated. To extract or replace the irradiated materials, the detector cover, see FIG. 3A-3B, is easily removable by unscrewing the cover holding nut 108. In case of the assembly shown in FIG. 4A, the cover 301, is similarly removed.

Isotope production involves several interrelated activities such as target material fabrication, target irradiation in reactor or accelerator, transportation of irradiated target, etc. The activity of the produced radioisotope is directly related to the target material activation. In case the neutron flux is isotropic and monoenergetic, the target activation rate can be represented by:

$$\frac{dN'}{dt} = nv\sigma_{act}N_T$$

where

N' is the number of activated atoms nv is neutron flux $\sigma_{act}(E)$ is activation cross-section related to neutron energy $N_T$ is the total number of atoms present in target, In case the neutrons are not mono-energetic and if local velocity distribution exists, it can lead to errors in evaluating the activity of the produced isotope. The invention provides to the ability to perform simultaneous and accurate measurements of gamma rate, fast and slow neutron flux measurements in the same enclosure the target material is irradiated. These measurements enable the evaluation of the irradiated doses, even in presence of local fluctuations of the neutron flux and their energies. By the method provided by the invention, the estimation of the target reaction rate can be improved enhancing the quality and activity accuracy of the produced radioisotopes.

Accordingly, the invention provides a process for producing radioisotopes, comprising placing targets in at least one cell devoid of removable foils and anode of the device of the invention, irradiating the targets to convert into radioisotopes, while fast and slow neutron flux (and optionally gamma radiation) are constantly measured with said device.

To produce the radioisotopes, suitable neutron flux may vary from $10^{13}$-$10^{14}$ nv with irradiation times being in the range from a few minutes up to a few hours or more.

The "free cells", i.e., cells devoid of removable foils and anode can serve for other purposes as well. For example, the free cells can be used as receptacles to hold materials to be irradiated for radiation hardness investigations. Polymers, adhesives, and a variety of other products for use in aerospace industry or in nuclear reactors equipment need accurate assessment of the amount of radiation to which the materials are resistant. Because materials endurances to gamma and neutron doses are different, a device capable to provide accurate measurement at the irradiation point, has many benefits for assessing the radiation doses that the exposed models can withstand.

As mentioned above, canisters produced by AM techniques, which are capable of holding the removable coated foils for the purpose of neutron detection, constitute a separate aspect of the invention. In particular, the invention relates to a canister comprising a base, a cylindrical lateral surface (101) and a cover, wherein the canister comprises an array of internal slots suitable for holding opposite edges of rectangular foils within the canister, said array of slots comprising:

longitudinally-aligned central slots (e.g., 104A, 104B, 104C, 104D) provided on a rod which is positioned axially (103 or 108) within the canister, longitudinally-aligned peripheral slots (e.g., 105A, 105B, 105C, 105D) distributed around the circumference of the cylindrical lateral surface and facing said central slots; and longitudinally-aligned lateral slots in the form of a set of channels provided adjacent to the lateral surface.

More specifically, the canister comprises n (n≥2) T-beam shaped structures (106) distributed around the circumference of the lateral surface (e.g., 106A, 106B, 106C, 106D) as previously described in reference to the drawings. The canister further contains permanent partitions 107A, 107B, 107C and 107D, said partitions extending radially outward from the central longitudinal rod 103 or 108. Each permanent partition (e.g., 107D) joins a T-Beam shaped structure positioned in a radial direction (e.g., 106D). The aforementioned canister is provided with a cover or a cover assembly as previously described.

A kit comprising the canister and one or more removable foils coated with neutron sensitive materials (e.g., two or more foils with different coatings) to be inserted into the canister, form another aspect of the invention.

EXAMPLES

Example 1

Design and Manufacture of a Device of the Invention Using AM Technique

1. Using mechanical design software such as "Solid works", define the dimensions of the detector main enclosure and its cover, File type Part(*.sldprt and *.prt). It is possible to adapt the dimensions proposed in this invention (e.g., external diameter 30 mm, active length 40 mm), or design the required length and diameter according to specific needs.

2. With the aid of the same software, define the cells of the main cylindrical enclosure and a central rod according to the embodiment presented in FIGS. 2A and 2B. Different cells may be implemented according to application requirements.

3. On the detector cover, define the holes through which the anode pins will be inserted. The position of each hole should be just above the center of a corresponding cell in the detector's main enclosure.

Figure 1:
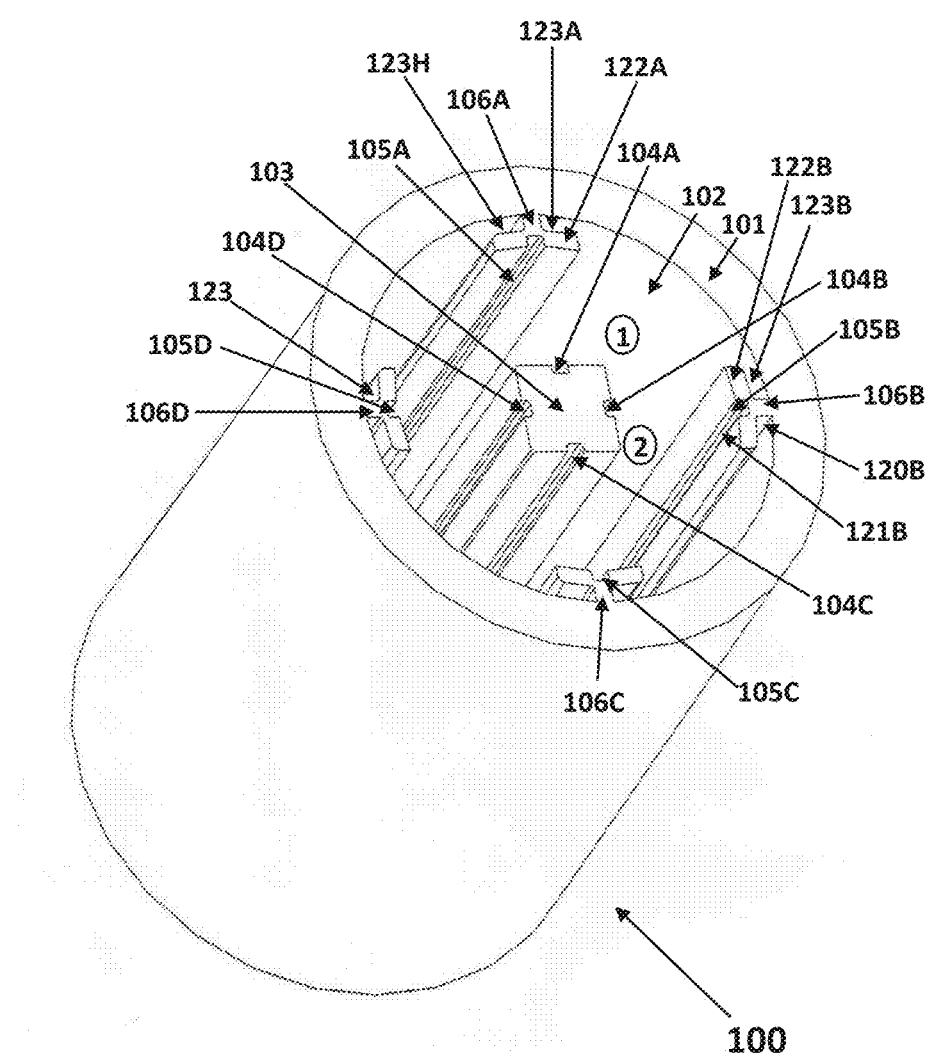
FIG. 1 is an isometric view of the device of the invention in a configuration devoid of permanent partitions, illustrating an array of slots needed to hold in place the removable foils.
Figure 2A:
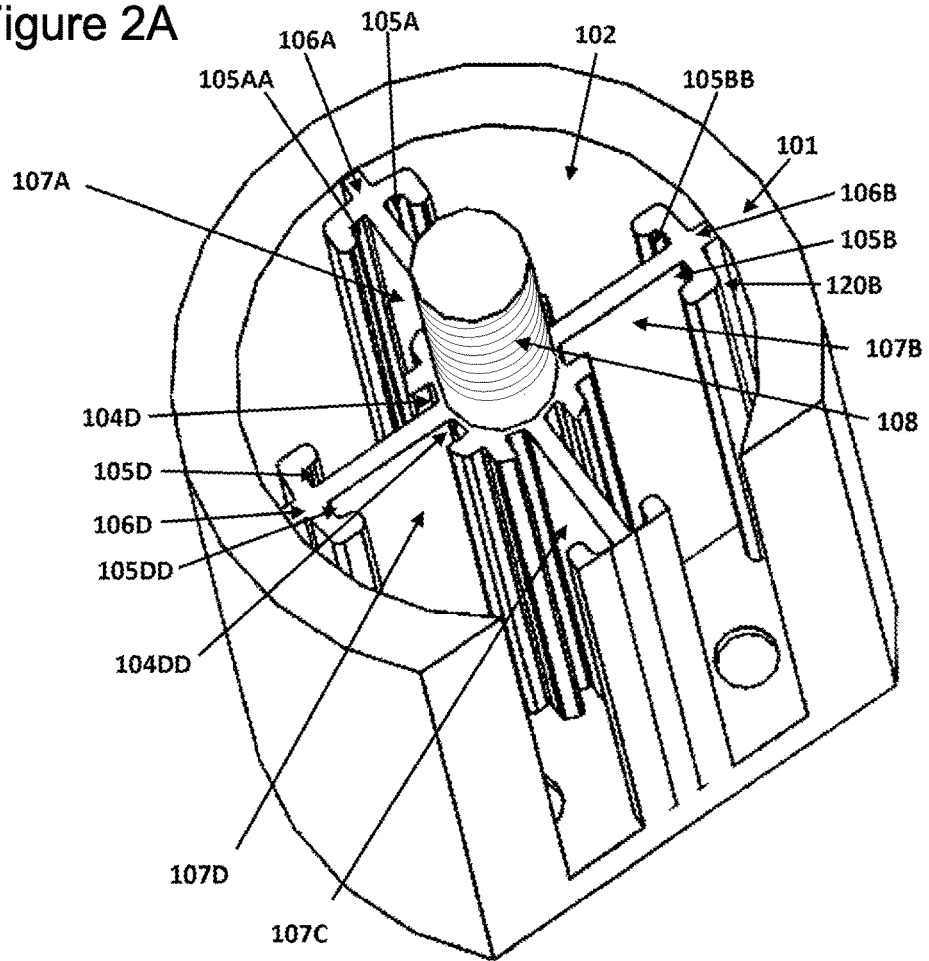
FIGS. 2A and 2B are an isometric view and a photo, respectively, of a device of the invention in a configuration containing permanent partitions, capable of supporting the removable foils.

4. Design rails that are capable of holding a thin metal foil, as shown in FIG. 2A. Each of the permanent partitions defining cells intended to serve as neutron detection ion chambers must contain a pair of rails on at least one face thereof.

5. At the center of the detector cover define a hole through which the central rod (central screw) will pass. Also design a thin slot around the detector cover. In this groove an O-ring or soft metal (e.g. indium wire) will be inserted.

6. Convert all designed components, file type Part(*.prt) to a pre-printer file—type Parasolid (*.x_t).

7. To evaluate the design concept, convert all models files type *.sldprt to STL(*.stl) files, and manufacture demi-components (3D printing of polymer material).

8. Convert pre-printer files—(*.sldprt or *.prt) Parasolid (*.x_t) to STL(*.stl) files to evaluate manufacturing capabilities by Additive Manufacturing (AM) techniques.

9. Upload all models file STL(*.stl) (*.sldprt) to "Magic" software, and evaluate the drawing according to the relevant Additive Manufacturing (AM) machine criteria.

10. Validate the designed files for compatibility to the AM process, including supporting design.

11. Using AM techniques for aluminum alloys produce the detector main enclosure, its cells and the rails that support the metal foils. Similarly produce the components of the detector cover.

12. Release residual efforts by thermal treatment process, 300° C./2 hr in a controlled Argon environment.

13. Remove the detector main enclosure from the AM platform by EDM wire cutting process.

14. In sealing areas and joints finalize each manufactured part by common machining processes, make a bolt from the central bar of the main detector enclosure. Select a suitable nut for this screw.

15. Prepare the removable thin metal foils that will be inserted through the rails of the inner walls of cells (i.e., the permanent partitions).

16. Coat the metal foils with the appropriate neutron reacting materials. For measurements of slow neutron $^{10}B_4C$ coating is required. Similarly, for slow and fast neutron measurements, the recommended coating material is $^{nat}UO_2$. For fast neutron measurements, the recommended reacting material is thorium. These coating can be made by sputtering, vapor deposition or electrochemical coating methods.

17. Insert the coated foils through the rails to be supported on the permanent walls.

18. Insert thin conductors (anode wires) through the cavities in the detector cover. These wires penetrate the detector cover and serve as anodes of each 'sub-detector', therefore the length of such wire is a few millimeters shorter than the active length. Use Torr Seal® paste to insulate the wires from the detector cover. Keep the wires perpendicular to the detector main enclosure and let 24 h the Torr Seal® paste to dry (207).

19. On the outer side of the detector cover, solder a signal wire of a coax cable to each anode wire. On the detector side, leave the shield of the coax cable floating (un-connected). The other side of each the coax cable is connected to a BNC or similar connector according to common wiring procedures. Repeat this procedure to all neutron detection ion chambers having anode mounted in their interior.

Figure 3A:
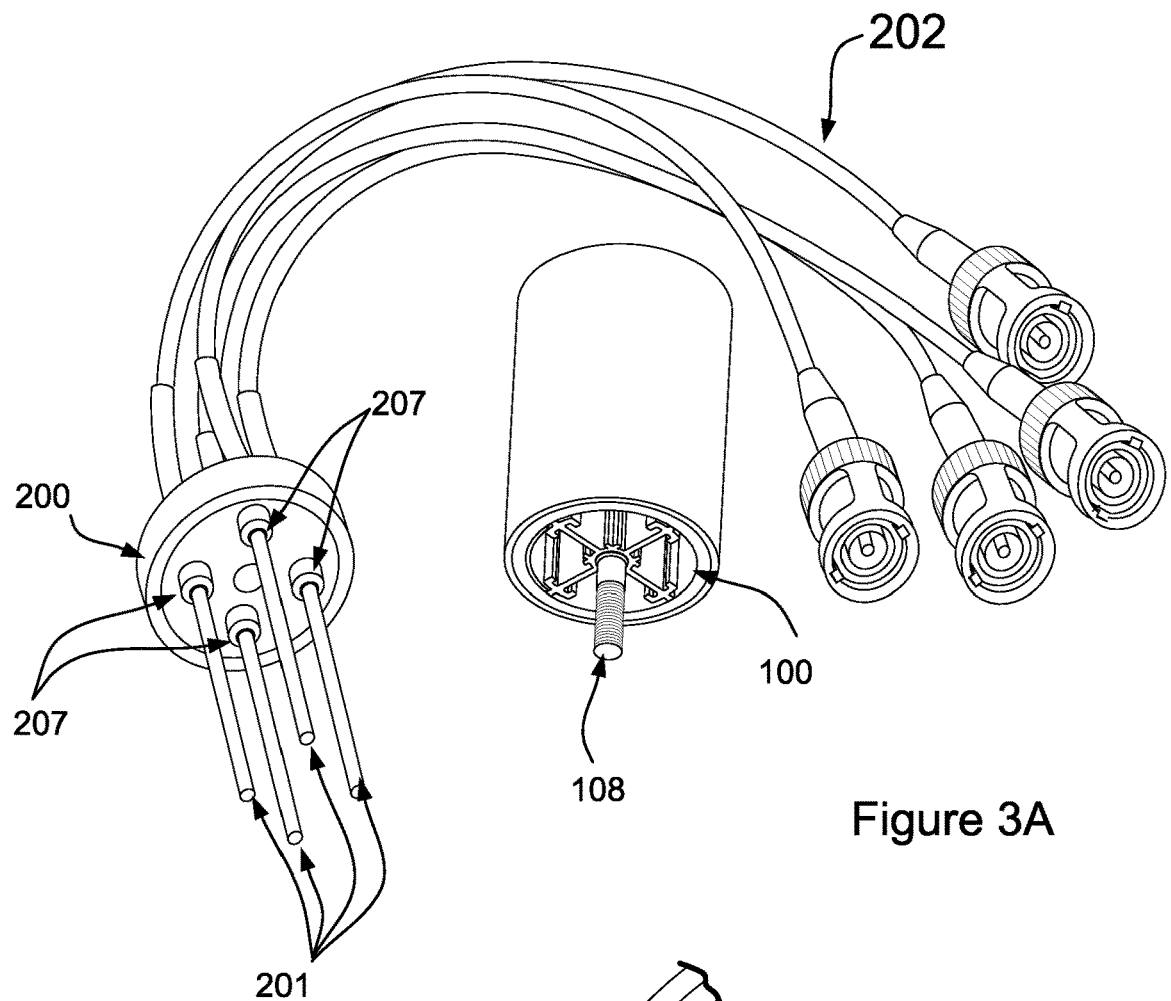
FIGS. 3A and 3B are photos showing the cover of the detector with electrical connections.
Figure 3B:
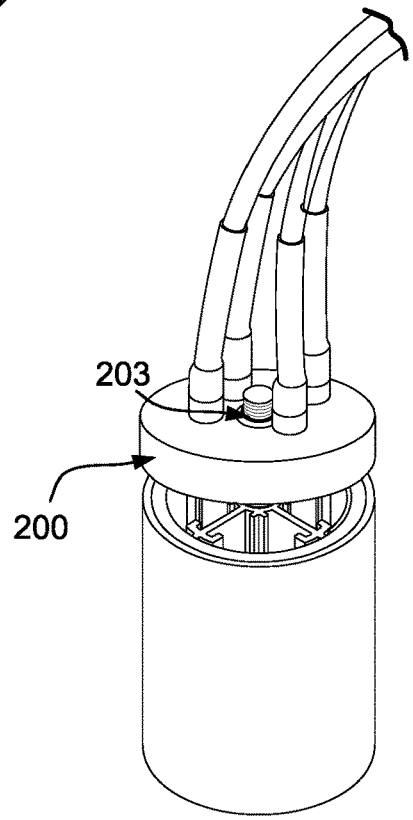

20. Solder or lock the signal wire of a coax cable to a cable lock and insert it around the central screw (108 in FIG. 3A). Leave the shield of the coax cable floating. The other side of this coax cable is connected to a −HV power supply (typ. few hundred Volts for current measuring applications.) Connect the shield of the coax to the power supply common (GND).

Figure 4A:
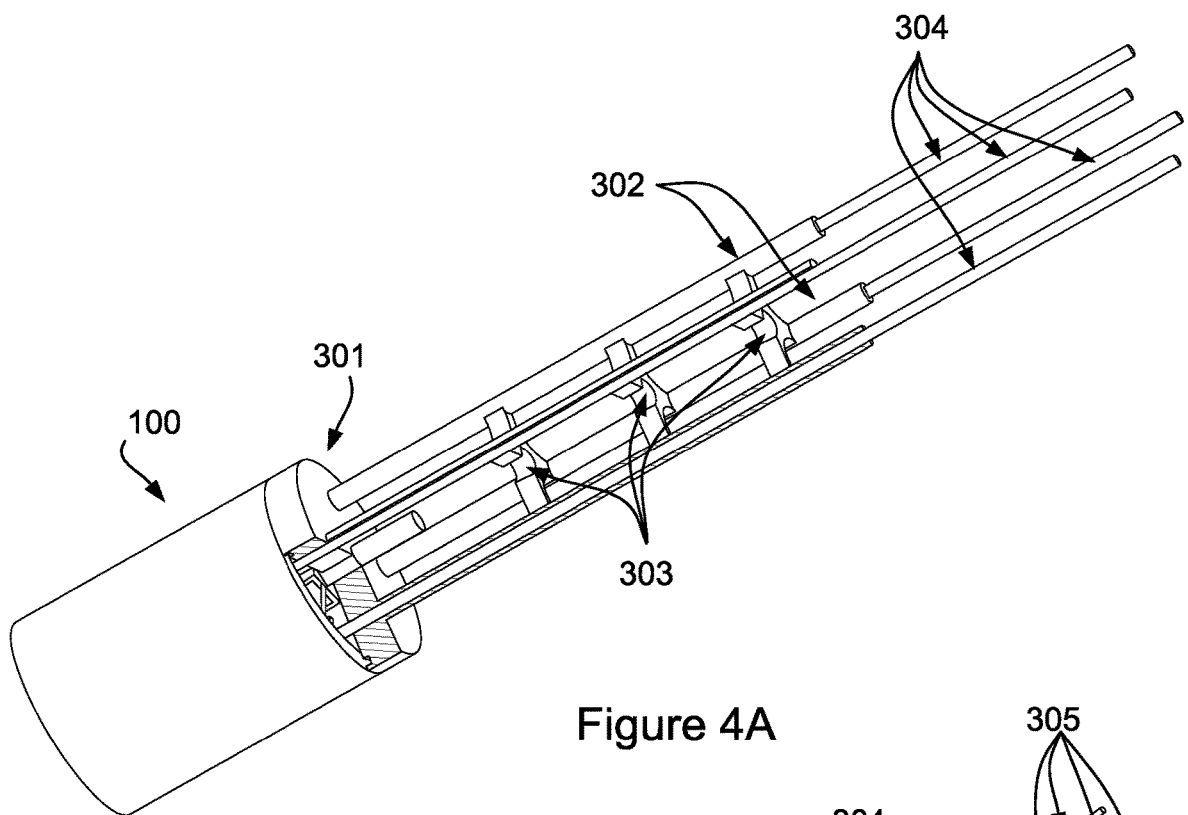
FIGS. 4A, 4B and 4C are isomeric views of a cover assembly of the invention.
Figure 4B:
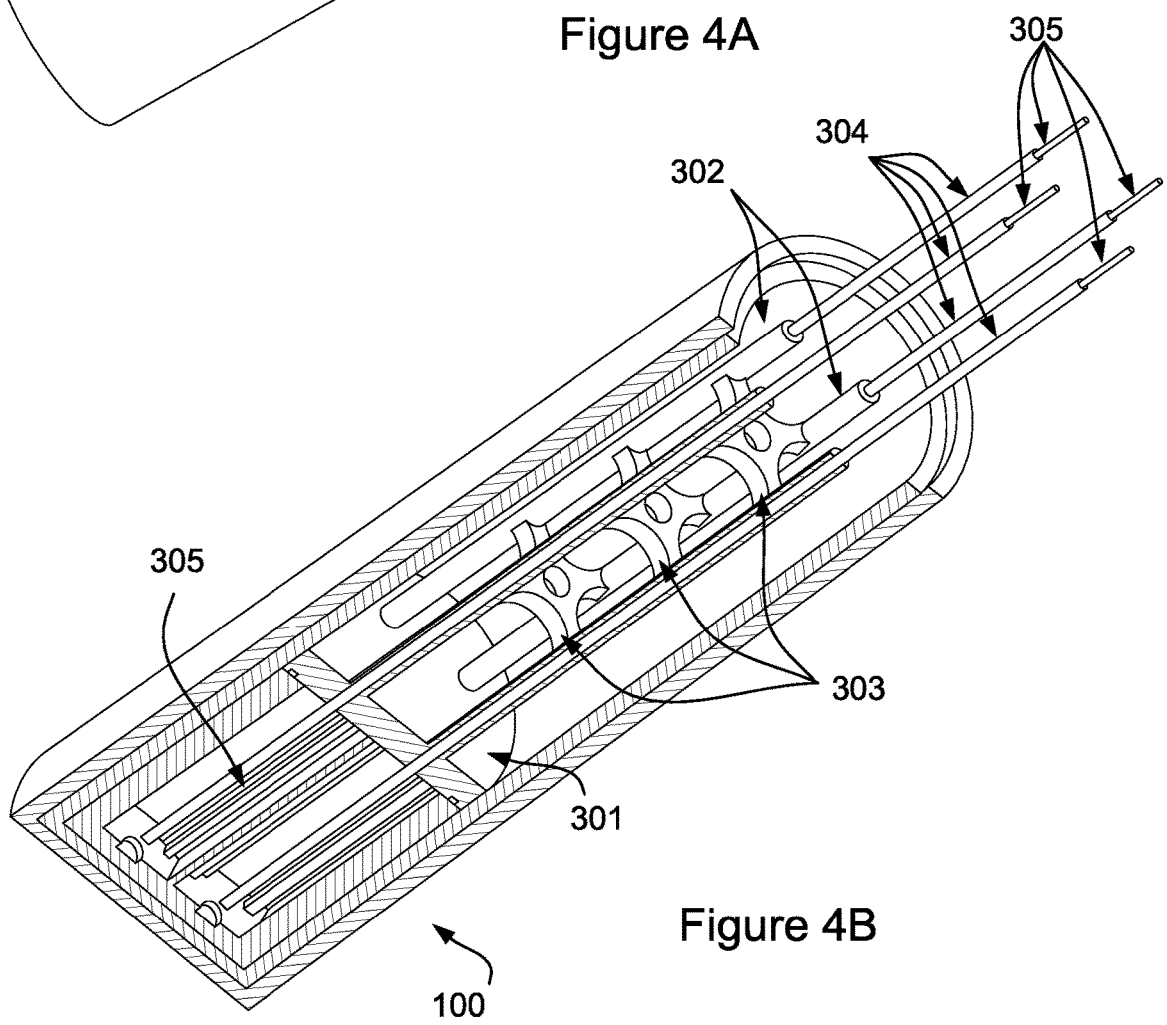
Figure 4C:
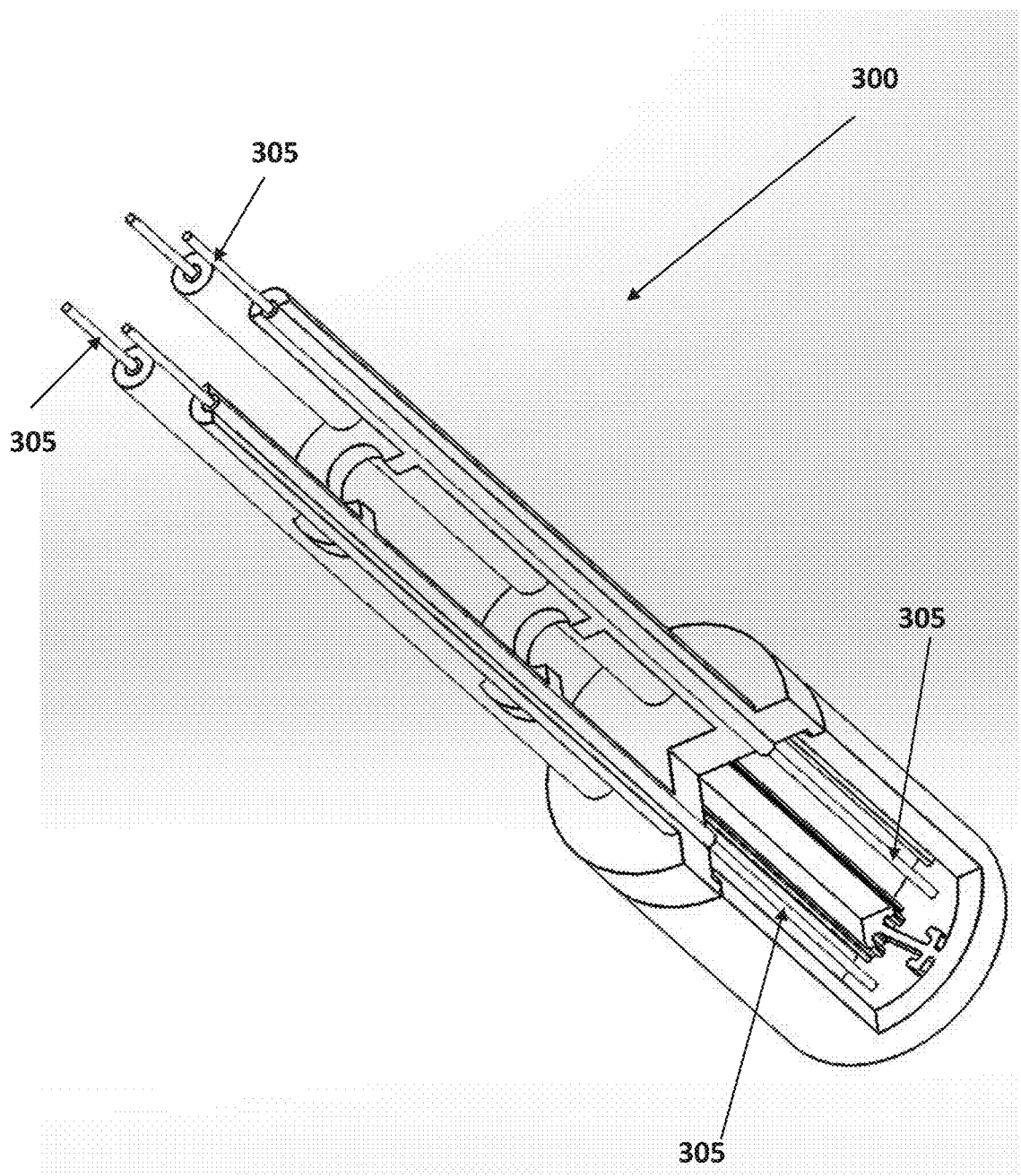
Figure 5:
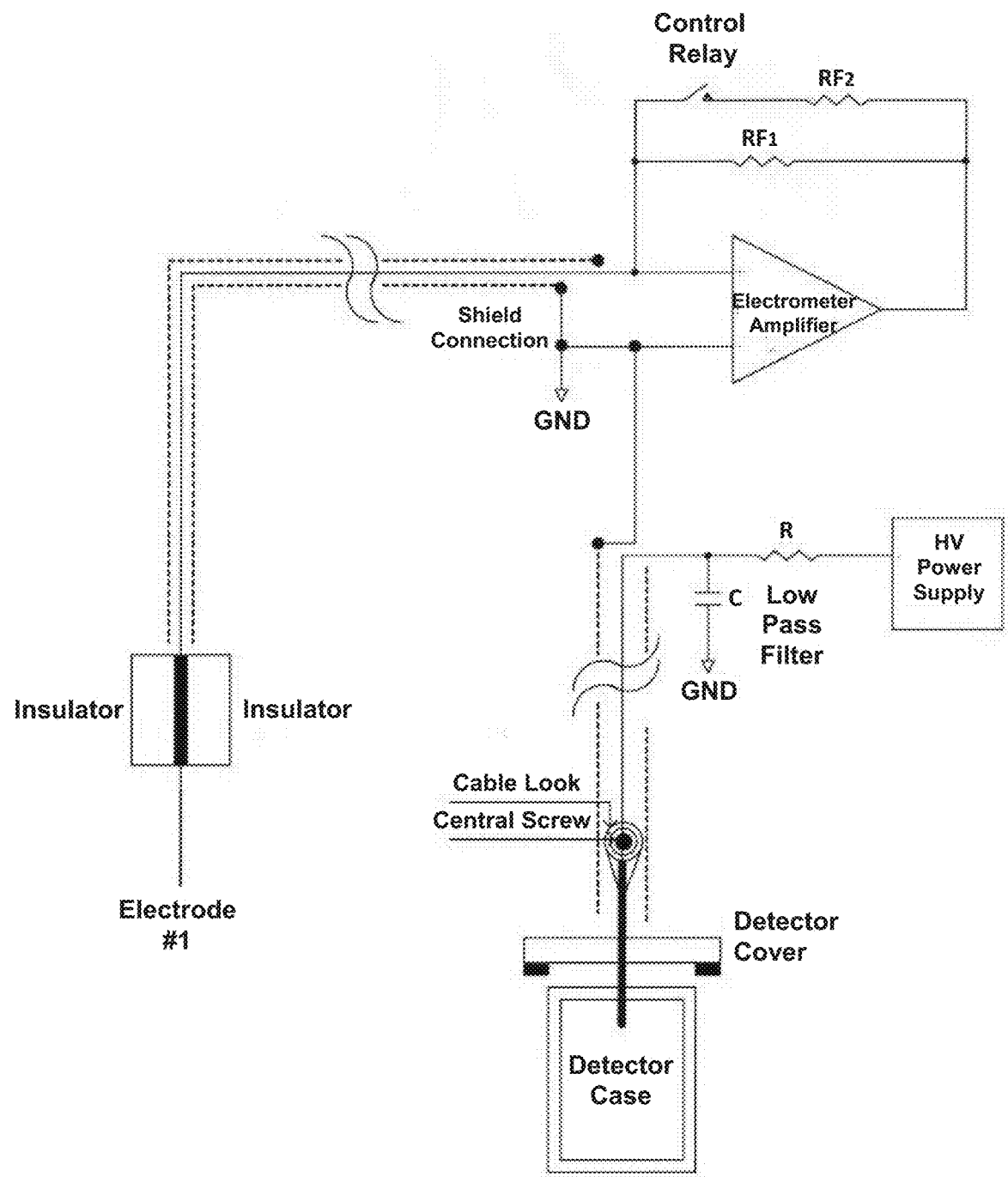
FIG. 5 is a schematic diagram of the electrical connections of the detector to electrometer type preamplifier.
Figure 2A:
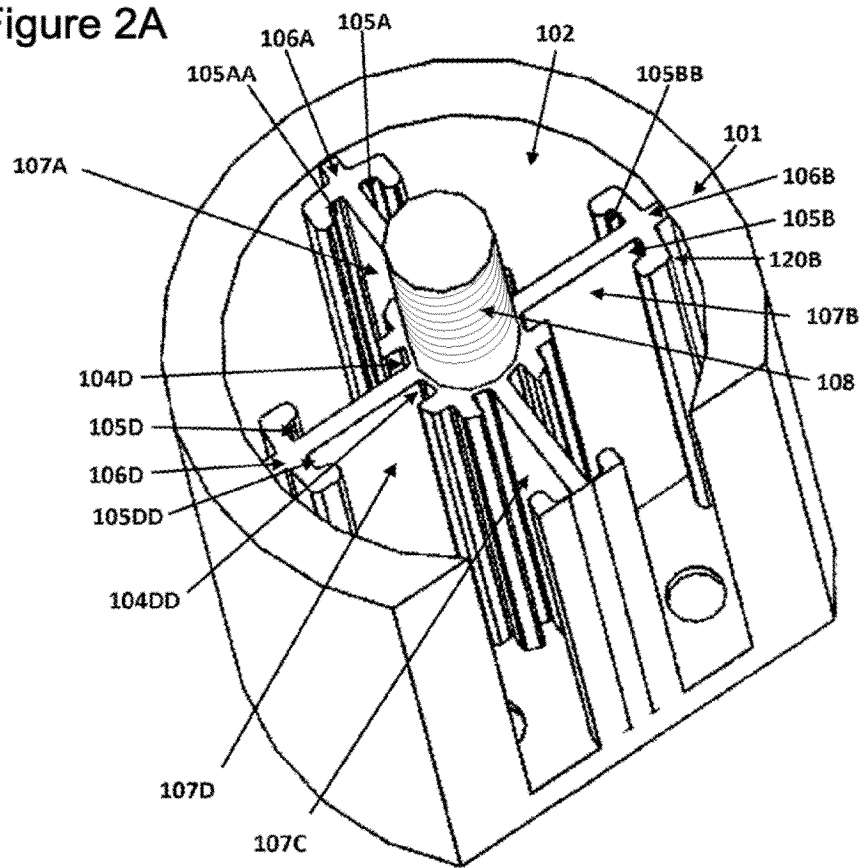
Figure 2B:
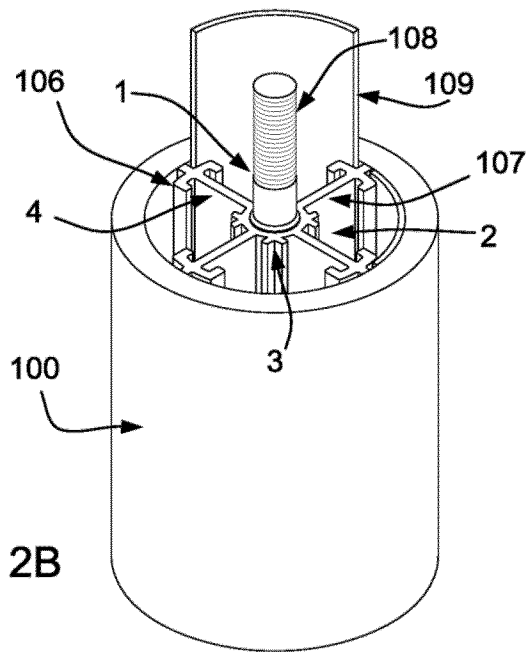

21. Alternatively to 18, design and produce via 3D printing the cover assembly with protecting tubes and supporting spacers shown in FIGS. 4A-4C. With laser (e-beam) welding technique, weld the detector case with its cover.

22. Cut ceramic tubes corresponding in length to the printed protecting tube. The ceramic tubes have an outer diameter smaller than the inner diameter of the protecting tubes. The ceramic tube is pasted with Torr Seal® (for example) to the protective tube. Cut a rigid conductor wire in the length of the protective tube plus the length of anode protruding into the cell in the interior of the detector housing. The outer diameter of the rigid conductor wire is less than the inner diameter of the ceramic tube. Push the rigid wire through the ceramic tube, the exposed length inside the detector will serve as an anode while its other end at the free protecting tube end is used for further connection to coaxial cable that will feed the pre-amplifiers and HV bias.

23) The assembly of the different parts in step 22 is carried out in an argon or xenon atmosphere after replacing (flushing) the atmosphere inside the detector case with the chosen gas. The ceramic paste will seal the detector, rigid conductor wire inside the ceramic, and the ceramic inside the printed protecting tube. The paste sealing can be done near the tubes free end where radiation fields are significantly lower than near the detector case.

The invention claimed is:

1. A device for detecting neutrons, which is an in-core neturon detector, comprising a base, a lateral surface and a cover, thereby providing a detector housing having a central longitudinal axis, wherein the interior of the housing is divided into n (n≥2) cells wherein at least two of said cells are adapted to operate as neutron detection ion chamber by each having at least one removable foil disposed parallel to said longitudinal axis, at least one removable foil positioned adjacent to, and essentially parallel with, a sector of the lateral surface, with said removable foils having neutron sensitive coating applied on at least one of their faces, and an anode mounted in each one of said at least two cells adapted to operate as neutron detection ion chambers bounded by said removable foils, with said housing constituting the cathode;

wherein a first neutron detection ion chamber has a first neutron sensitive coating applied on the removable foils defining the walls of the said first ion chamber, and the second neutron detection ion chamber has a second neutron sensitive coating applied on the removable foils defining the walls of the said second ion chamber, wherein said first and second neutron sensitive coatings are made of different materials; and wherein the cover is a cover assembly comprising a cover base and at least two or more tubes extending upwardly from said cover base, with each of said two or more tubes enclosing a conductor guided via the respective tube through an access hole in the cover base into a respective cell in the interior of the detector housing, said conductor being electrically insulated from the inner walls of said tube by means of an insulator occupying the annular space between the inner walls of said tube and said conductor.

2. A device for detecting neutrons according to claim 1, comprising a base, a lateral surface and a cover, thereby providing a detector housing having a central longitudinal axis, where an axially positioned rod is mounted;

wherein the interior of the housing is divided into n (2<n≤10) cells, wherein each of said cells which is adapted to operate as neutron detection ion chamber is defined by:

a pair of removably disposed foils extending essentially radially outward from the axially positioned rod mounted along the central longitudinal axis; and a removably disposed foil placed adjacent to, and essentially parallel with, a sector of the lateral surface.

3. A device according to claim 2, wherein the housing comprises an array of slots holding the removably disposed foils, said array of slots comprising:

longitudinally-aligned central slots;

longitudinally-aligned peripheral slots facing said central slots; and longitudinally-aligned lateral slots;

wherein opposite edges of a removably disposed, radially extending foil are held by a pair of opposing slots, consisting of a longitudinally-aligned central slot and a longitudinally-aligned peripheral slot; and wherein opposite edges of a removably disposed foil in a position adjacent to, and parallel with, the lateral surface, are held by a pair of lateral slots.

4. A device according to claim 3, wherein the lateral surface of the housing is a lateral surface of a cylinder, with an axially positioned rod mounted inside the housing and a set of longitudinally aligned central slots provided on said axially positioned rod and a set of longitudinally aligned peripheral slots distributed around the circumference of the lateral surface, and a set of channels provided adjacent to the lateral surface.

5. A device according to claim 4, comprising n (n≥2) T-beam shaped structures distributed around the circumference of the lateral surface wherein the vertical section of each T-beam shaped structure is attached to the lateral surface and is parallel to the axially positioned rod, with the front of the two-arms section of the T-beam shaped structure facing the axially positioned rod.

6. A device according to claim 5, wherein the two-arms section has a recess extending over its length, defining a longitudinally aligned peripheral slot opposite to a longitudinally aligned central slot recessed in the axially positioned rod, with the opposite edges of a removable foil being held by said pair of opposite slots;
 wherein channel-like spaces are provided between the lateral surface of the housing and the back of the two-arms section of the T-beam shaped members, said channels defining pairs of opposite slots adjacent to the lateral surface, such that the opposite edges of a removable foil are held by said pair of opposite lateral slots in a position adjacent to and parallel with the lateral surface.

7. A device according to claim 1, wherein the first neutron sensitive coating is $^{10}B_4C$ and the second neutron sensitive coating is $UO_2$.

8. A device according to claim 1, comprising permanent partitions extending radially outward from the central longitudinal axis to join a sector of the lateral surface thereby defining cells.

9. A device according to claim 8, wherein at least one removable foil is supported onto one face of a permanent partition.

10. A device according to claim 8, wherein one or more cells defined by permanent partitions is (are) devoid of an anode and/or of removable foils.

11. A device according to claim 10, wherein one or more cells defined by permanent partitions is (are) devoid of removable foils, said cell(s) having anode mounted in their interior, said cells being suitable for detection of gamma radiation.

12. A device according to claim 10, wherein one or more cells defined by permanent partitions is (are) devoid of removable foils and anode, said cell(s) being suitable as receptacle(s) for target materials to be converted into radioisotopes by neutron activation.

13. A method for producing radioisotopes, comprising providing a device as defined in claim 12, placing targets in one or more of the cells of said device, which cells are devoid of removable foils and anode, irradiating the targets to convert into radioisotopes, while fast and slow neutron flux (and optionally gamma radiation) are constantly measured with said device.

* * * * *

UNITED STATES PATENT AND TRADEMARK OFFICE
CERTIFICATE OF CORRECTION

PATENT NO. : 11,002,868 B2
APPLICATION NO. : 16/274506
DATED : May 11, 2021
INVENTOR(S) : Beck et al.

It is certified that error appears in the above-identified patent and that said Letters Patent is hereby corrected as shown below:

In the Drawings

Figure 2B:
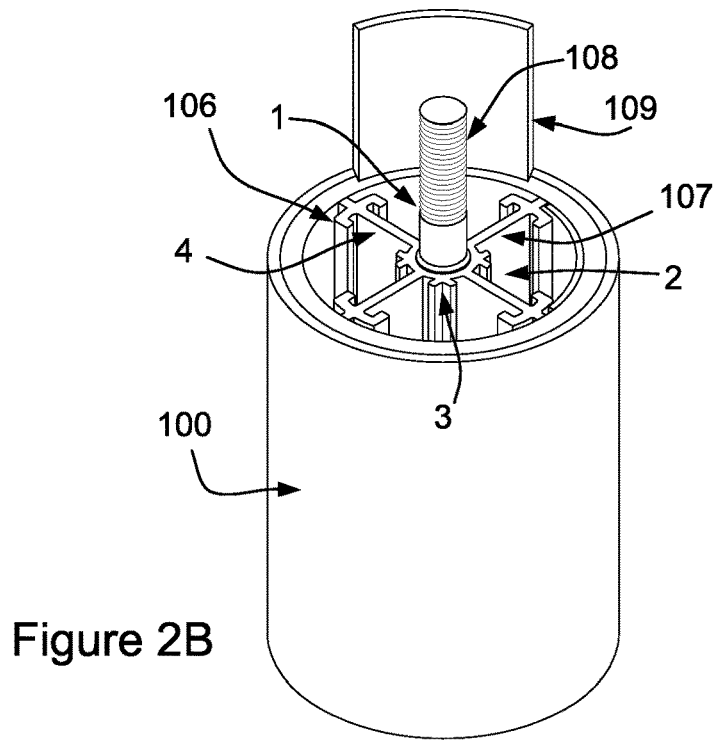

Sheet 2 of 6, Fig. 2B, element 109 should be insertable and form one of the sides of the cell 1, and the middle circular line at the edge of the cylindrical tubular body should not be present. Therefore, replace Sheet 2 of 6 with the attached replacement sheet including Fig. 2A and Fig. 2B.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*